J. SCHAUB.
APPARATUS FOR CONTAINING AND CONSUMING FUEL.
APPLICATION FILED FEB. 25, 1918.
1,305,671.
Patented June 3, 1919.
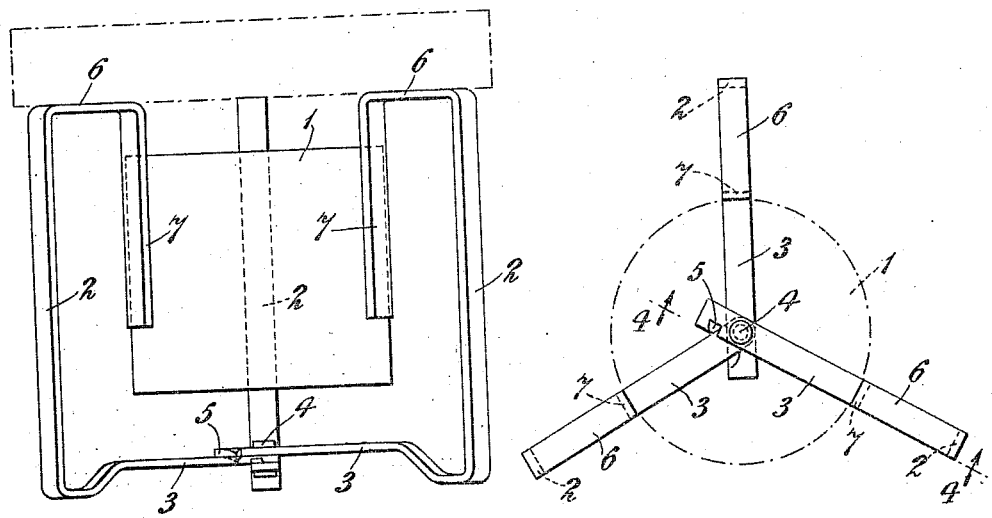
Fig. 1
Fig. 2
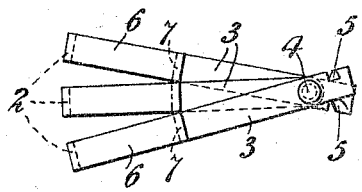
Fig. 3
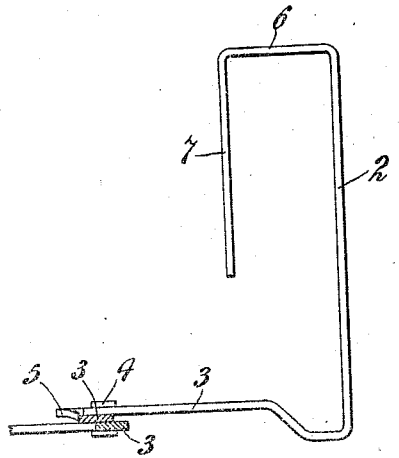
Fig. 4
Jacob Schaub, Inventor
By his Attorney Henry M. Bagham

UNITED STATES PATENT OFFICE.

JACOB SCHAUB, OF NEWARK, NEW JERSEY, ASSIGNOR TO AMERICAN LINSEED COMPANY, A CORPORATION OF NEW JERSEY.

APPARATUS FOR CONTAINING AND CONSUMING FUEL.

1,305,671.

Specification of Letters Patent.  Patented June 3, 1919.

Application filed February 25, 1918. Serial No. 219,071.

*To all whom it may concern:*

Be it known that I, JACOB SCHAUB, a citizen of the United States, and a resident of Newark, in the county of Essex and State of New Jersey, have invented certain new and useful Improvements in Apparatus for Containing and Consuming Fuel, of which the following is a specification.

The objects of my invention are to produce a container in which fuel may be stored and burned, to which supporting legs may be attached and detached, and by which the dish or other object to be heated may be supported.

These and the other objects of my invention will be more fully set forth in the following specification and claims.

In the accompanying drawings, Figure 1 is an elevation of my invention. Fig. 2 is a plan view looking upward, the fuel container being shown in dotted lines. Fig. 3 is a plan view showing the supporting legs in folded position. Fig. 4 is an elevation, partly in section.

Similar numerals refer to similar parts throughout the accompanying drawings.

My invention as shown in the accompanying drawings consists of a container 1 and the supporting legs 2, which are preferably three in number. The lower inwardly bent ends 3 of the legs are tapped to receive the stud 4, and lugs 5 are formed on each leg in such manner as to bear against the adjacent leg when the legs are spread into the position shown in Fig. 2, that is, radiating at equal angles from each other.

The upper ends of the legs are bent to form inwardly disposed or horizontal portions 6 which serve as a support for the dish or other object to be heated, and downwardly extending fingers 7, which are adapted to bear against the side of the container in which the fuel is also burned, the pressure of the fingers 7 against the side walls of the container being such that the container is vertically adjustable and will be supported by the frictional contact of the fingers 7 in any position to which the container is adjusted.

It is obvious that if a dish or other object is supported as shown in dotted lines on Fig. 1, and the container moved upward until it rests against the bottom of the dish that the flame will be extinguished for want of air to support the combustion, and that the rapidity of the combustion of the fuel in the container may be accurately regulated by the regulation of the fuel container with reference to the object to be heated.

I claim:

1. Apparatus for containing and consuming fuel, comprising in combination a cylindrical fuel container, and resilient legs having inwardly disposed depending fingers adapted to clamp the side walls of the container and support the container in an elevated position and the object to be heated in an elevated position above the container.

2. Apparatus for consuming fuel comprising in combination a cylindrical fuel container, and resilient legs having inwardly disposed upper portions provided with downwardly extending resilient fingers adapted to clamp the side walls of the container and permit vertical adjustment of the container.

3. Apparatus for containing and consuming fuel, comprising in combination a cylindrical fuel container, and resilient legs pivotally connected together at the lower ends, said legs at their upper ends having inwardly disposed portions provided with downwardly extending fingers adapted to support the container and permit vertical adjustment of the container with reference to the object to be heated, said inwardly disposed portions of the legs adapted to support said object above the container.

4. Apparatus for containing and consuming fuel, comprising a plurality of legs having transverse lower portions pivotally connected together, the upper portions of the legs having inwardly disposed portions to support an object, said portions having depending resilient fingers adapted to support a fuel container therebetween below said object.

Signed at New York city, in the county of New York and State of New York, this 18th day of February, 1918.

JACOB SCHAUB.

Witnesses:
PAUL R. JAMES,
MARGARET A. HECK.

Copies of this patent may be obtained for five cents each, by addressing the "Commissioner of Patents, Washington, D. C."